US011999554B2

(12) United States Patent
Donner et al.

(10) Patent No.: US 11,999,554 B2
(45) Date of Patent: Jun. 4, 2024

(54) CARTRIDGE AND METHOD FOR PRODUCING A CARTRIDGE

(71) Applicant: Hilti Aktiengesellschaft, Schaan (LI)

(72) Inventors: Tobias Donner, Munich (DE); Thomas Ayrle, Langerringen (DE); Ralf Willner, Tussenhausen (DE)

(73) Assignee: HILTI AKTIENGESELLSCHAFT, Schaan (LI)

(*) Notice: Subject to any disclaimer, the term of this patent is extended or adjusted under 35 U.S.C. 154(b) by 88 days.

(21) Appl. No.: 17/755,802

(22) PCT Filed: Dec. 2, 2020

(86) PCT No.: PCT/EP2020/084281
§ 371 (c)(1),
(2) Date: May 9, 2022

(87) PCT Pub. No.: WO2021/115880
PCT Pub. Date: Jun. 17, 2021

(65) Prior Publication Data

US 2022/0396412 A1 Dec. 15, 2022

(30) Foreign Application Priority Data

Dec. 13, 2019 (EP) .................................... 19216107

(51) Int. Cl.
*B65D 83/00* (2006.01)
*B05C 17/005* (2006.01)
(Continued)

(52) U.S. Cl.
CPC .... *B65D 83/0072* (2013.01); *B05C 17/00586* (2013.01); *B65B 3/04* (2013.01);
(Continued)

(58) Field of Classification Search
CPC ...................... B65D 83/0072; B05C 17/00586
See application file for complete search history.

(56) References Cited

U.S. PATENT DOCUMENTS 5,303,852 A 4/1994 Yamawaki et al.
5,501,368 A 3/1996 Brandhorst et al.
(Continued)

FOREIGN PATENT DOCUMENTS

DE 94 00 524 U1 5/1995
DE 102 50 715 6/2003
(Continued)

OTHER PUBLICATIONS

International Search Report dated Jan. 12, 2021 in PCT/EP2020/084281, with English translation, 5 pages.
(Continued)

*Primary Examiner* — Jeremy Carroll
(74) *Attorney, Agent, or Firm* — Grüneberg and Myers PLLC

(57) ABSTRACT

A cartridge for a dispensing device contains at least one elongate film pouch, which is inherently non-rigid and which has a chamber for receiving a composition. The cartridge also contains a head part for interacting with the film pouch. The film pouch has an opening on a side facing the head part which is closed by a cover. The insert is conical on a side facing the head part. A method can be used for producing such a cartridge.

20 Claims, 10 Drawing Sheets

(51) Int. Cl.

| | |
|---|---|
| ***B65B 3/04*** | (2006.01) |
| ***B65B 7/02*** | (2006.01) |
| ***B65B 61/02*** | (2006.01) |

(52) U.S. Cl.

CPC ................ *B65B 7/02* (2013.01); *B65B 61/02* (2013.01); *B65D 2205/02* (2013.01)

(56) References Cited

U.S. PATENT DOCUMENTS

| | | | | |
|---|---|---|---|---|
| 5,653,360 | A | 8/1997 | Brandhorst et al. | |
| 9,975,139 | B2 * | 5/2018 | Turner | B05C 17/01 |
| 10,434,528 | B1 * | 10/2019 | Seiler | B05B 11/0081 |
| 10,821,469 | B2 * | 11/2020 | Grontved | B05C 17/0126 |
| 10,870,127 | B2 * | 12/2020 | Bodenmüller | B32B 27/32 |
| 10,906,702 | B2 * | 2/2021 | Seiler | B65D 35/242 |
| 2014/0246454 | A1 * | 9/2014 | Schulz | B65D 83/0033 222/137 |

FOREIGN PATENT DOCUMENTS

| | | |
|---|---|---|
| DE | 20 2018 105 661 U1 | 1/2019 |
| EP | 3 199 248 | 8/2017 |
| JP | H01139375 | 5/1989 |
| JP | H05-54345 U | 7/1993 |

OTHER PUBLICATIONS

Written Opinion dated Jan. 12, 2021 in PCT/EP2020/084281, with English translation, 8 pages.

* cited by examiner

CARTRIDGE AND METHOD FOR PRODUCING A CARTRIDGE

CROSS-REFERENCE TO RELATED APPLICATIONS

This application is the National Stage entry under § 371 of International Application No. PCT/EP2020/084281, filed on Dec. 2, 2020, and which claims the benefit of priority to European Application No. 19216107.3, filed on Dec. 13, 2019. The content of each of these applications is hereby incorporated by reference in its entirety.

BACKGROUND OF THE INVENTION

Field of the Invention

The present invention relates to a cartridge for a dispensing device and to a method for producing a cartridge.

Description of Related Art

Cartridges are primarily used for storing material such as glue, sealing compound, mortar, paint or lubricants. In addition, the material can easily be applied to an object via the cartridges, provided that the cartridge is inserted into a corresponding dispensing device. The material can be applied precisely using the dispensing device. For example, a rod of the ejection device presses against a base of the cartridge, as a result of which the volume of the cartridge is compressed, such that the material located in the cartridge is pressed out of an opening. An attachment can be attached to the cartridge so that the material can be applied to the object in a controlled and precise manner.

Cartridges are known from practice which are designed having an inherently non-rigid film pouch and an inherently rigid insert. The film pouch has a cylindrical wall and a base part, the insert being connected to the film pouch at an end remote from the base part. The insert is annular and has a circular opening closed by a cover, through which opening the chamber can be filled with the material.

In a cartridge of this type, it may be the case that the cover becomes detached from the insert in an undesired manner.

SUMMARY OF THE INVENTION

The object of the invention is to provide a cartridge in which a cover is securely attached to the insert in a simple manner. A further object of the invention is to provide a method for producing such a cartridge.

The object is achieved by the subject matter as described below. Advantageous embodiments relating to the subject matter can be found further below.

A cartridge for a dispensing device is proposed, the cartridge having at least one inherently non-rigid, elongate film pouch, which has a chamber for receiving a composition, having a head part for interacting with the film pouch and having an inherently rigid insert, which insert is connected to the film pouch on a side facing the head part and has a passage closed by a cover. According to the invention, it is proposed that the insert be conical on a side facing the head part.

DETAILED DESCRIPTION OF THE INVENTION

Figure 1:
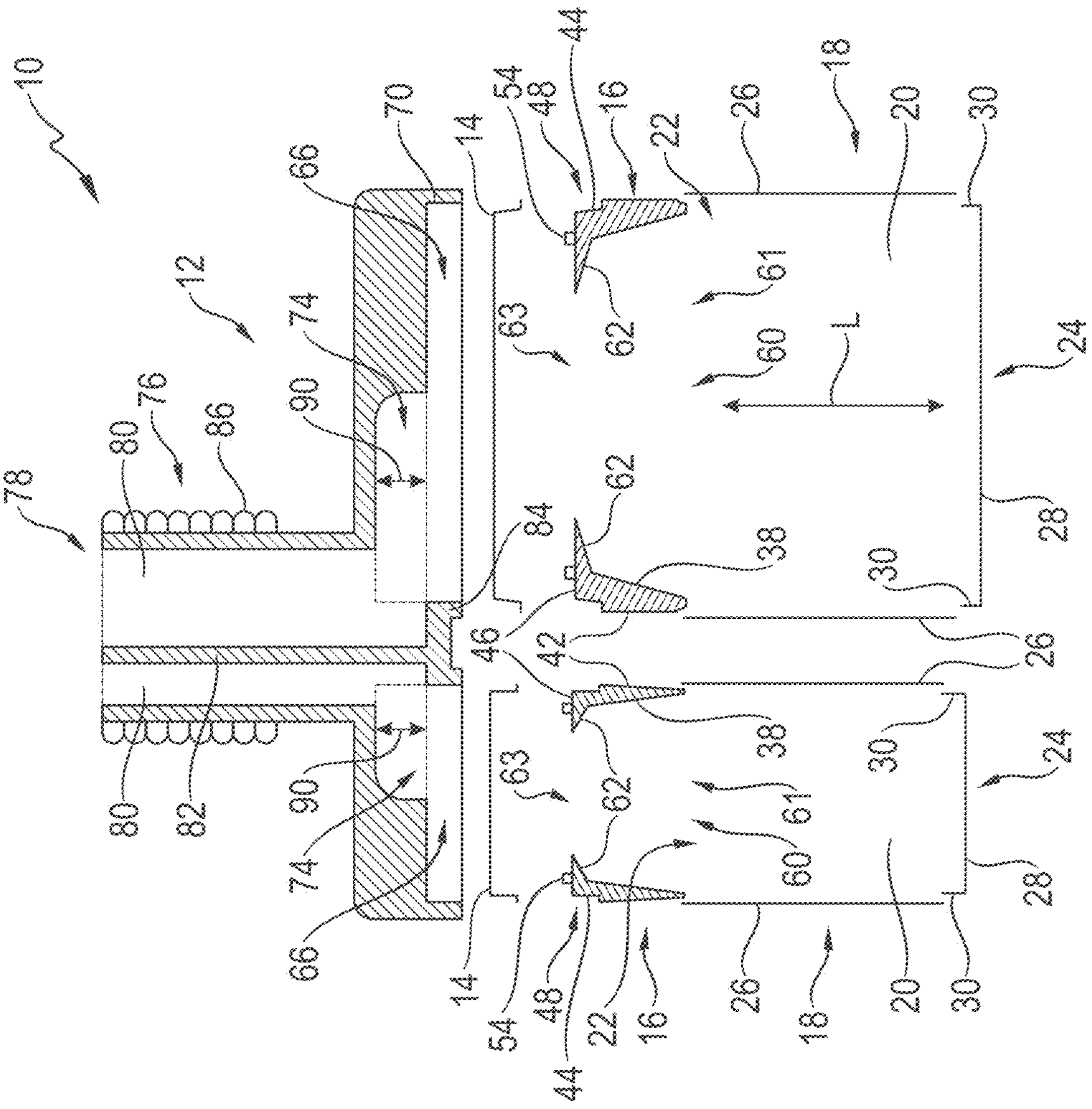
FIG. 1 shows a longitudinal section through a cartridge according to the invention in a first embodiment in an exploded view.

Due to the conical design of the insert, a cartridge can be provided in a structurally simple manner, in which cartridge a cover connected to the insert can be easily and securely attached to the insert under all conditions and securely holds on the insert. Furthermore, undesired peeling or shearing off and/or damage to the cover, which is designed as a film, for example, is reliably prevented because of the favorable introduction of force. Due to the conical design of the insert, the cover can reliably withstand even high pressures within the chamber, since in the event of a pressure increase in the chamber before opening, a notch effect in the connection region of the cover to the insert is low.

It has been found to be particularly advantageous if a surface of the insert facing the head part encloses an angle between 10° and 50° with a horizontal perpendicular to a central axis of the film pouch, with a region of the surface facing the central axis being at a greater distance from a base part of the film pouch than a region of the surface facing away from the central axis. The angle particularly preferably has a value between 15° and 35°, in particular approximately 25°.

In an advantageous embodiment of the invention, the cover has a predetermined breaking region. This provides a cover that is easy to use. On the one hand, the cover securely closes the film pouch and prevents unwanted leakage of the material in the chamber out of the chamber. On the other hand, the cover allows a simple and safe and, in particular, defined opening in order to be able to deliver the composition located in the chamber. The opening properties are improved by the predetermined breaking region, in particular when the cartridge is used in a dispensing device.

Due to the predetermined breaking region in the cover, the cartridge can be opened in a dispensing device in particular in a defined manner with comparatively low forces. At the same time, the cover can be designed, in a simple manner, to be stable so as to reliably prevent self-opening of the cartridge, for example if it accidentally falls down. By means of the cover, leakage of the composition located in the cartridge can also be very slightly or completely prevented in a simple manner and, in particular, can be significantly reduced in comparison with known cartridges.

The cover is designed in particular as a film; alternatively, it can also be designed in the form of a plate, for example, and represent a plastics plate, for example.

The predetermined breaking region can easily have any shape and, depending on the application, can be, for example, round, oval, square, rectangular, angular or linear or have a combination of these shapes.

In an advantageous embodiment of a cartridge according to the invention, the cover has, in the predetermined breaking region, a defined material discontinuity at least in regions, in particular in an entire planar region, in comparison with a further region of the cover. The cover has a simple design and can be produced cost-effectively, thus allowing the cover to be opened reliably and in a defined manner in the predetermined breaking region. The defined material discontinuity can be formed, for example, by the cover having, in the predetermined breaking region, an increased or reduced material thickness at least in regions in comparison with a further region of the cover. This allows the cover to be opened reliably and in a defined manner in the predetermined breaking region. Such a cover can also be produced easily and cost-effectively.

The predetermined breaking region of the cover can also have a different material strength from a further region of the cover. This also allows the cover to be opened reliably and in a defined manner in the predetermined breaking region.

A further region of the cover is understood here to be a region of the cover that is not associated with the predetermined breaking region and extends outside the defined predetermined breaking region. In the further region of the cover, there are preferably substantially constant material properties.

In an advantageous embodiment of a cartridge according to the invention which is particularly cost-effective to produce, the predetermined breaking region of the cover is delimited by a linear material weakening. The linear material weakening encompasses the predetermined breaking region in particular completely and thus separates the predetermined breaking region from the further region of the cover. The linear material weakening can be both a continuous, in particular uniform, material weakening as well as a perforation, the material thickness or the material strength of the linear material weakening being both less and greater than the material thickness of the further region of the cover.

In order to be able to achieve a defined opening of the cover in the state of use, in an advantageous embodiment of the invention the predetermined breaking region of the cover can have a defined different material strength from a further region of the cover. In this case, a different strength or a different material structure from that in the further region of the cover can be provided in the predetermined breaking region, completely or in a region encompassing the predetermined breaking region in a linear manner. This can be achieved, for example, by the action of temperature, in particular by means of laser or energetic radiation.

The predetermined breaking region of the cover can preferably have a notch that is star-shaped, cross-shaped, in line form, circular, semicircular or the like. The special geometry of the notch makes it possible to adjust the pressure required to open the cartridge. In addition, the shape and spatial arrangement of the notch can influence the opening characteristics.

In order to be able to fill the film pouch particularly quickly and to safely allow the air present in the film pouch to escape, the insert can have at least one ventilation opening independent of the passage and/or at least one ventilation slot independent of the passage. The passage is in particular circular and, when the film pouch is being filled, is preferably at least approximately close to a filling tube of a filling device. Air located in the chamber of the film pouch can easily escape through the ventilation opening and/or the ventilation slot. After the filling process, the ventilation opening and/or the ventilation slot can be closed in particular in a sealing manner by the cover, so that the composition located in the chamber is sealingly enclosed.

Alternatively or in addition, the passage of the insert can have at least one ventilation notch in a region facing the central axis of the film pouch, such that during a filling process of the film pouch by means of a filling device, which has a filling tube having a circular cross-section, air located in the chamber of the film pouch can escape through the ventilation notches directly along the filling tube.

Both the provision of the ventilation opening or the ventilation slot and the provision of ventilation notches prevent the occurrence of high pressures during a filling process, as a result of which the filling process can be carried out cost-effectively.

A plurality of ventilation openings and/or ventilation slots are preferably provided, which are in particular uniformly distributed around the circumference of the insert.

In an embodiment of the invention that is structurally simple to produce, the ventilation openings have a substantially circular cross-section. The ventilation slots are preferably arranged substantially concentrically to a central axis of the insert.

The ventilation notches can have a substantially rectangular, triangular, curved or comparable shape.

In an advantageous embodiment of a cartridge according to the invention, the insert and the head part each have, in mutually facing regions, an interacting and substantially diametrically opposed contour, the cover that is arranged in the region of the contours being weldable. In this way, the cover can preferably not only be connected to the insert in a welding process, but the insert can alternatively or additionally also be connected to the head part by means of the cover by means of a welding process. A welding tool provided for this purpose preferably has a cylindrical recess substantially corresponding to the film pouch and can be guided around the film pouch in the direction of the insert from a side facing away from the head part, the welding tool being designed to heat the cover at least in the region of the contours of the insert and the head part such that the insert can be welded to the head part by means of the cover. The welding tool engages around the particular film pouch preferably on the outside.

The film pouch can preferably be formed by a cylindrical film tube which is closed at the bottom by a base part, the base part being in particular glued and/or welded to the film tube. The film tube, also called tubular film or blown film, can be made of a thermoplastic material, and the film tube can be extruded or welded or glued at its longitudinal seam. Since the base part is in particular glued and/or welded, this produces an integral bond, which improves the storage properties of the cartridge, such that a leakage rate of the cartridge is reduced compared to a cartridge in which a film pouch is closed by a clip closure.

The cartridge has, for example, a head part which comprises at least one receptacle for the at least one insert. The head part represents a type of adapter, since the head part allows commercially available attachments or standardized dispensing devices to be used to apply the composition located in the cartridge. The insert, which partially protrudes beyond the film pouch, thus represents an interface to the head part.

It is possible that the insert has a stepped raised portion on its side protruding from the film pouch, via which raised portion the insert is received in the receptacle of the head part. The raised portion allows stable receiving of the insert in the receptacle of the head part. This also improves the tightness during operation.

Likewise, the cover can rest against at least two surfaces of the stepped raised elevation that are, for example, substantially perpendicular to one another. In this way, the cover can also be fastened in a stable manner to the insert on the lower face and in the receptacle of the head part on the upper face. Furthermore, this also reduces the leakage.

In an embodiment, the head part has an outlet nozzle that is in fluid connection with the receptacle. The outlet nozzle can define the flow rate, in particular via its diameter.

It is possible that the outlet nozzle has a thread. Commercially available attachments or dispensing devices for applying the composition located in the cartridge can be attached to the head part precisely at an outlet opening of the outlet nozzle by means of the thread, thus making it possible to precisely position and dose the composition during application.

The outlet nozzle can also have a partition which divides the volume into two or more outlet channels. The relative position of the partition in the outlet nozzle defines the cross-sections of the outlet channels and thus the flow rates through these outlet channels.

The outlet channels can have different diameters. The outlet channels can be oriented coaxially with respect to one another.

The head part can thus be suitable for receiving several film pouches which can have different compositions. The head part separates the different compositions up to the outlet opening, such that the different compositions can come into contact only after the outlet opening. This is important in the case of two-component adhesives, for example.

The cartridge can thus receive different compositions and serve as a multi-component packaging. The different diameters of the outlet openings make it possible to set a special mixing ratio for the different compositions.

The compositions located in the cartridge can be a chemical composition or a liquid, for example components of a two-component mixture.

Sealing compounds, multi-component mortars, multi-component coating compounds, multi-component paints, multi-component foam precursors, multi-component adhesives, multi-component sealing compounds and multi-component lubricants can be stored in the corresponding cartridges.

The receptacle of the head part can be assigned an expansion space into which the cover can expand. The expansion space makes it possible to open the cover in a controlled manner, so that it does not hinder the flow of the outflowing composition. On the one hand, this results in a laminar flow, since there are no obstacles in the flow path that could result in a turbulent flow. On the other hand, this ensures that the flow rate is precisely maintained, which is important for the mixing ratio of two or more components.

In one embodiment, the passage is tapered. As a result, the passage acts like a confusor or a nozzle when the composition flows out. The tapered passage can also act as a diffuser when the film pouch is filled.

The passage can in particular be adapted to a filling cone of the composition located in the chamber. This makes it possible to optimally fill the chamber with a composition so that little or no air is left in the chamber.

In an embodiment, the cartridge has at least one second, elongate film pouch which is inherently non-rigid and has a chamber for receiving a composition. The cartridge can thus be used as a multi-component packaging. A resin, for example an epoxy resin, and a curing agent for a two-component adhesive can thus be stored in the same packaging.

The second film pouch can have the same length as the first film pouch, in which case a ratio of the bases of the film pouches determines a mixing ratio to be achieved. As an alternative to this, it is also possible for two film pouches to be used which have different lengths.

The base part can be made of a plastics material, such as polyethylene (PE), polypropylene (PP), polyethylene terephthalate (PET), polybutylene terephthalate (PBT), and/or acrylonitrile-butadiene-styrene copolymer (ABS). It is possible for the base part to be manufactured by injection molding, 3D printing or machining. It can also consist of a pre-formed mono- or multilayer film. It is possible that the base part is formed from the same or a comparable material as the cover. This makes it possible for the base part to be manufactured cost-effectively.

The film pouch can comprise a mono- or multilayer film. The total layer thickness is 50 to 350 μm, in particular 80 to 150 μm. The materials used can be PE, PP, PET, aluminum, ethylene-vinyl alcohol copolymer (EVOH), polyamides (PA), and/or polylactides (PLA). A coating with silicon oxide or aluminum oxide can also be provided for each layer. The multilayer film can be produced by adhesive or extrusion lamination.

The film pouch can preferably be evenly collapsed during a dispensing process, similar to an accordion, so that the entire composition in the chamber can be used as far as possible. When in use, the film pouch is exposed to chemical compositions or liquids which can sometimes act on the film pouch. An exact structure of the film pouch must therefore sometimes be adapted to the composition in the chamber or to the liquid in the chamber, in particular to the corresponding material properties.

The cover can preferably be designed as a multilayer film.

For example, the cover has a PE and/or a PP layer on the upper and lower sides so that it can be welded, for example thermally welded, to other plastics parts of the cartridge. The film can also have layers made of PVC, especially if other plastics parts of the cartridge are made of PVC.

A barrier layer can be provided between an upper face and a lower face of the cover, which layer, for example, prevents oxygen or water vapor from entering the chamber after it has been closed by the cover. This can reliably prevent outgassing of the composition located in the chamber.

The total thickness of the cover can be between 50 μm and 350 μm. In particular, the total thickness is between 130 μm and 250 μm.

The barrier layer can comprise, for example, aluminum or coatings of silicon oxide and/or aluminum oxide on PET, bi-axially arranged PP (BOPP), PA, PLA, or ethylene-vinyl alcohol copolymer (EVOH).

Multilayer films are preferred for chemically active compositions, i.e. demanding filling materials.

In a further aspect, the invention relates to a method for producing such a cartridge for a dispensing device, by means of the following steps:

- providing a film pouch having a chamber, which film pouch is connected to a dimensionally stable insert and a base part, the insert having an opening,
- filling the chamber with a composition through the opening, and
- closing the opening by means of a cover.

The technical advantages described for the cartridge apply analogously to the proposed method for producing the cartridge, such that the cover can be attached to the insert in a simple manner and the chamber closes securely. The cover is securely arranged on the insert even at high pressures in the chamber, damage to the cover being reliably prevented.

The production of the filled cartridge can also be separated into different production steps. In particular, the production of the film pouch is separated from the filling of the film pouch and the attachment of the film pouch in the head part.

The modular structure of the cartridge makes it possible for the individual elements to be adapted to different requirements of the cartridge which are imposed by the composition in the chamber. The decoupling of the production of the film pouch from the filling reduces the complexity of the production of the cartridge. This means that better quality can be guaranteed, as different machines and materials can be used for production and filling.

In an advantageous embodiment of a method according to the invention, a defined predetermined breaking region is produced in the region of the cover. The predetermined breaking region of the cover can be produced, for example, before the production of the film pouch, after the production of the film pouch, or during the production of the film pouch. The predetermined breaking region is preferably introduced into the cover only after the composition has been filled into the chamber and the chamber has been closed by the cover. In this respect, for example, material of the cover is removed from an outer face facing away from the chamber in order to form the predetermined breaking region. However, the predetermined breaking region can also be produced before the cover is attached to the chamber. This also results in the possibility of forming the predetermined breaking region on a lower face of the cover facing the chamber or of forming two opposing predetermined breaking regions on the lower and upper faces.

In an advantageous embodiment of a method according to the invention, the film pouch has a film tube and a base part, the film tube preferably being formed by welding or gluing.

In an advantageous embodiment of a method according to the invention, the predetermined breaking region of the cover is produced by means of a laser, a material weakening by hot stamping or by thermal stamping with a heated stamp, by scoring with a suitable cutting tool or knife, or during a process of welding the cover to the insert. In this way, it can be easily achieved that the predetermined breaking region has, in particular, a different material thickness and/or strength than further regions of the cover, and a defined predetermined breaking region is thereby formed.

When producing the predetermined breaking region during the welding process of the cover to the insert, in order to achieve the predetermined breaking region preferably at least one welding parameter is varied in relation to the connection of the cover to the insert in further regions and, for example, a higher pressure, an increased temperature or an extended welding duration or a combination of these parameters is used. The predetermined breaking region is thus produced in the immediate vicinity of the weld seam or in the weld seam itself.

In an advantageous embodiment of a method according to the invention, the insert has at least one material extension, in particular a material extension surrounding the passage, which melts during the closure of the passage. The tightness is improved as a result, since an integral bond of the insert with the cover can be ensured due to the melt. The material extension can surround the passage of the insert. It functions as the intended melting point of the insert, such that a high-quality cover is provided and no composition can escape from the chamber through the opening.

In an advantageous embodiment of a method according to the invention, a head part is provided which has at least one receptacle and the insert is inserted into the receptacle.

The head part allows the cartridge to be inserted into commercially available dispensing devices, such that the cartridge can be dispensed in a controlled manner when the composition in the chamber is applied to an appropriate object.

In addition, in an advantageous embodiment of a method according to the invention, a second film pouch having a chamber may be provided. The second film pouch can be designed analogously to the first film pouch and connected to the head part. The connection is preferably carried out by means of gluing or welding. Accordingly, a multi-component packaging or cartridge can be produced in a simple manner.

It is possible for a different cover to be provided for the various chambers.

In order to be able to ensure that the chambers are opened as synchronously as possible during the process of dispensing the cartridge, the covers of the various chambers can have differently designed predetermined breaking regions, for example different notches.

Further advantages can be found in the following description of the drawings. Various embodiments of the present invention are shown in the drawings. The drawings and the description contain numerous features in combination. A person skilled in the art will expediently also consider the features individually and combine them to form meaningful further combinations.

Figure 2A:
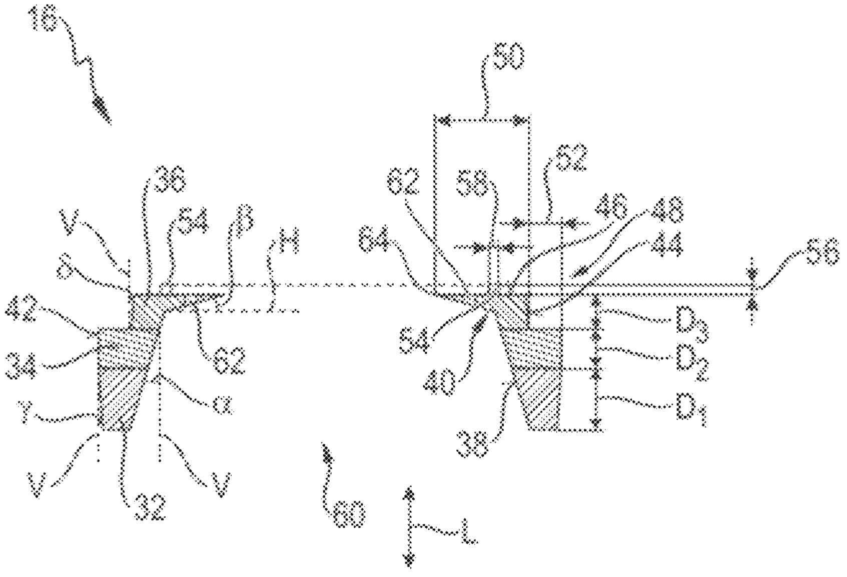
FIG. 2A shows a detailed view of the insert from FIG. 1 with a cover designed as a film in a longitudinal section.
Figure 2B:
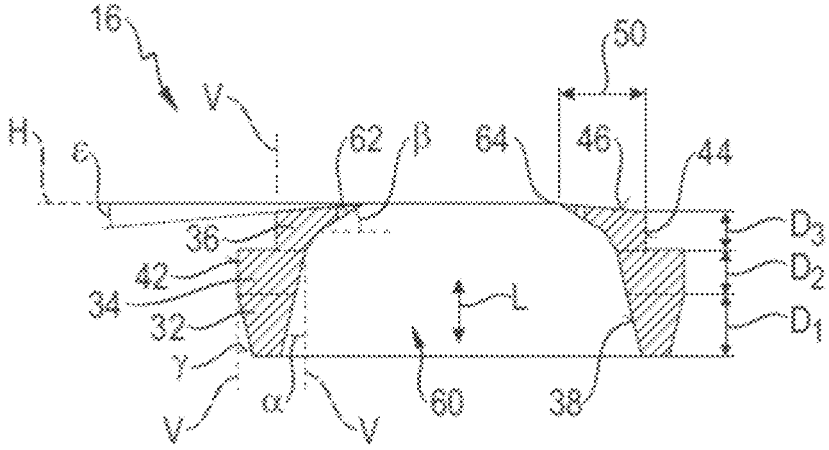
FIG. 2B shows a detailed view of a further embodiment of an insert for connecting a cover designed as a film according to FIG. 2A in a longitudinal section.
Figure 2C:
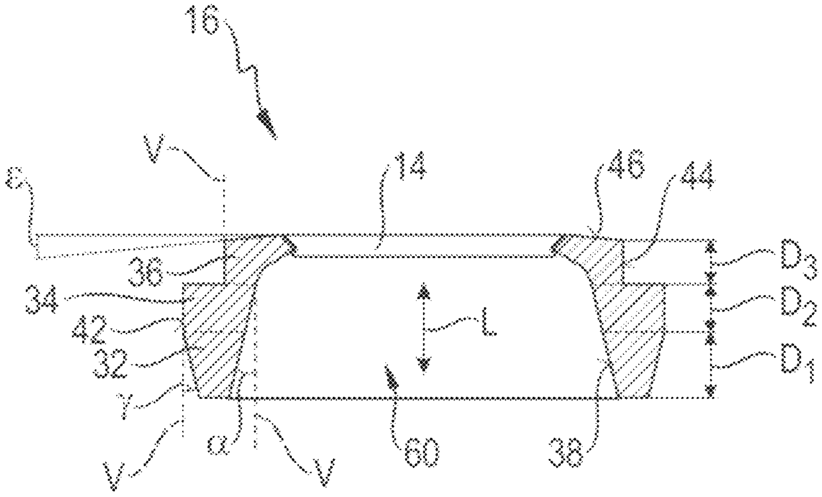
FIG. 2C shows a detailed view of the insert according to FIG. 2B with a cover designed as a plastics plate.
Figure 3A:
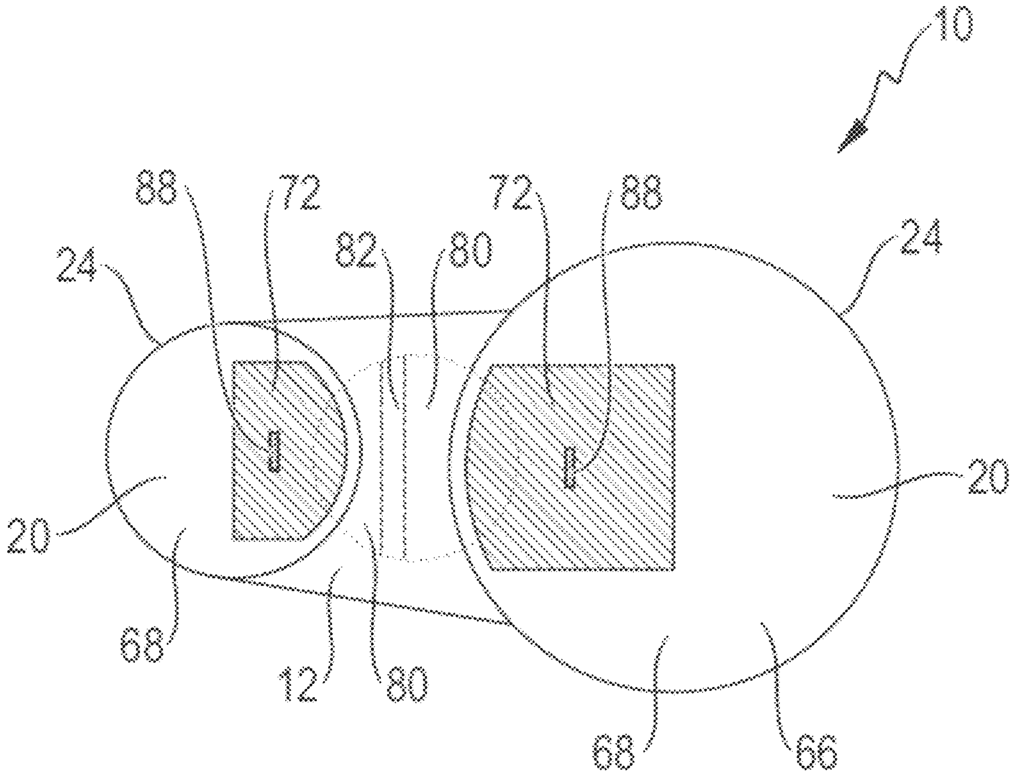
FIG. 3A shows a plan view of the cartridge from FIG. 1 with the predetermined breaking region.
Figure 3B:
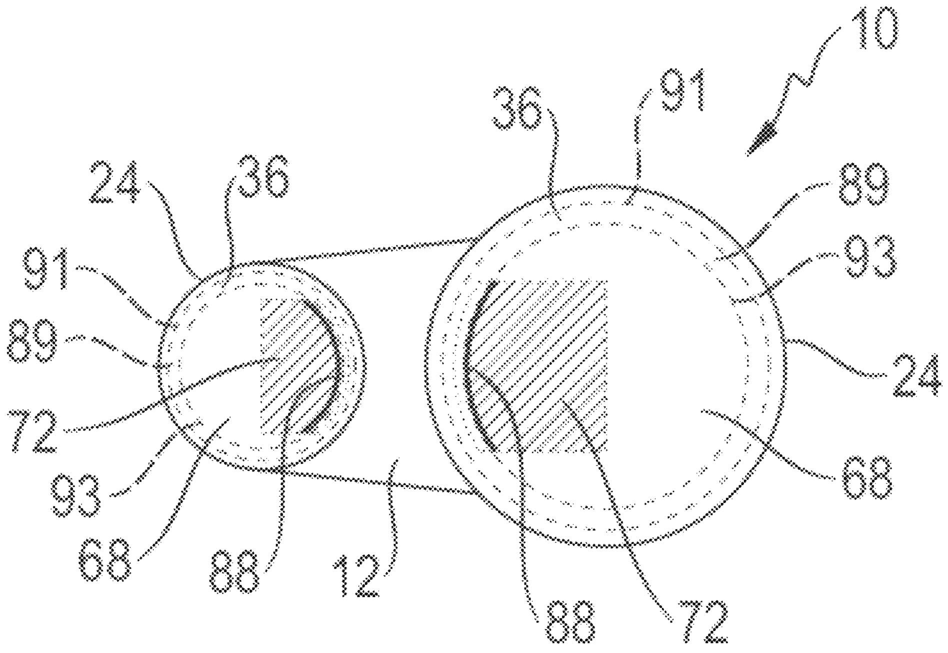
FIG. 3B shows a plan view of the cartridge from FIG. 1 with a further embodiment of the predetermined breaking region.
Figure 4:
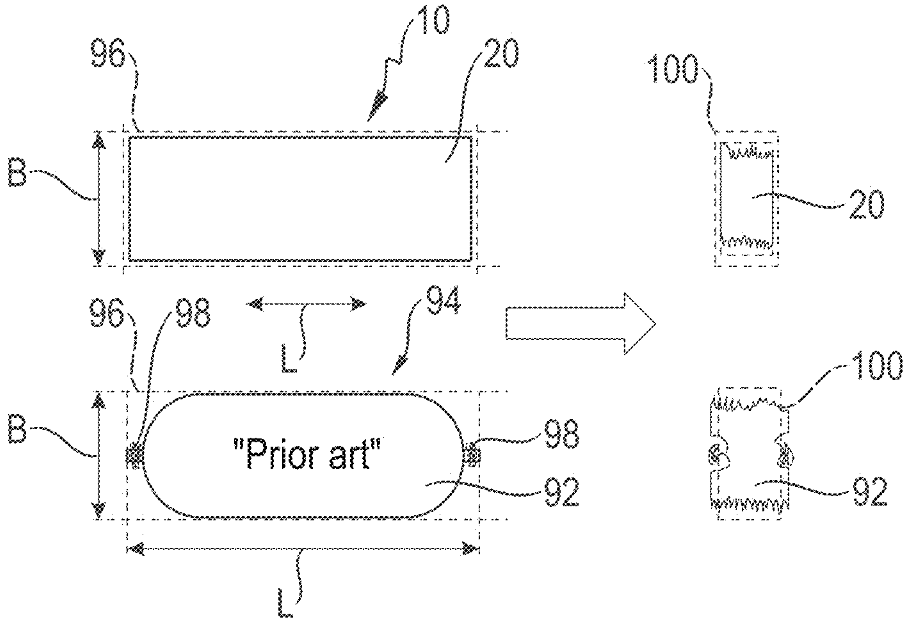
FIG. 4 shows a schematic comparison which compares the chamber from FIG. 1 with chamber known from the prior art and its dispensing behavior.
Figure 5:
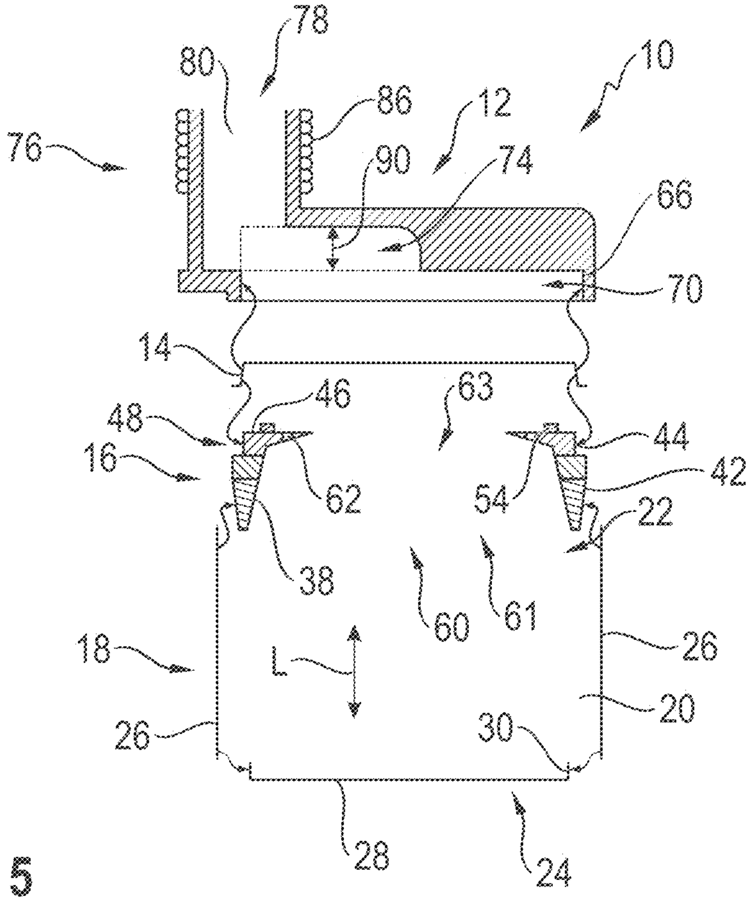
FIG. 5 shows a schematic illustration of the method according to the invention for producing a cartridge according to the invention in a second embodiment.
Figure 6:
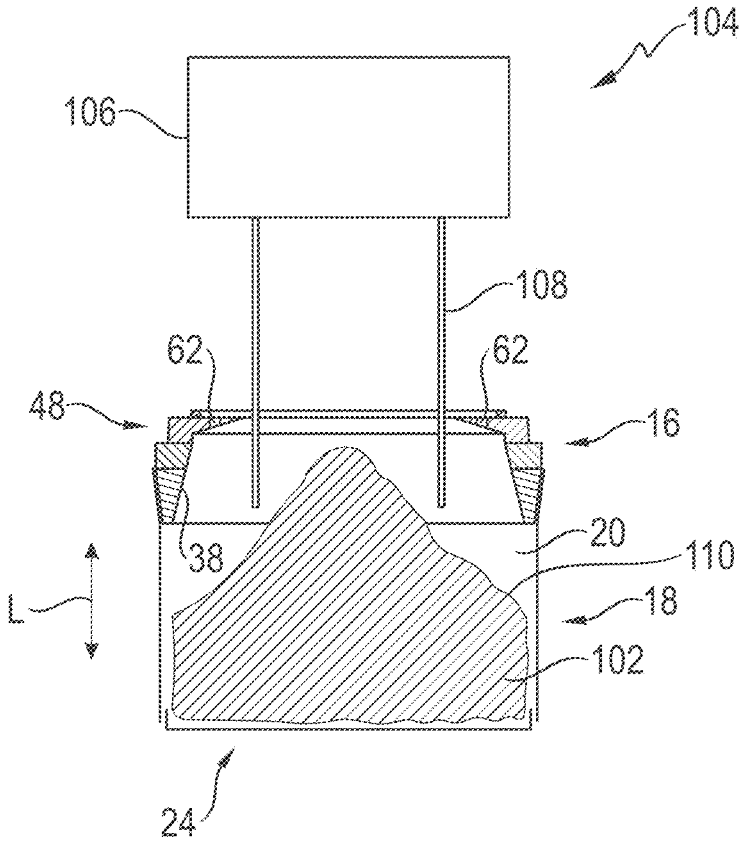
FIG. 6 shows a simplified view of a cartridge and a filling device for filling a chamber of the cartridge according to FIG. 1 with a chemical composition.
Figure 7A:
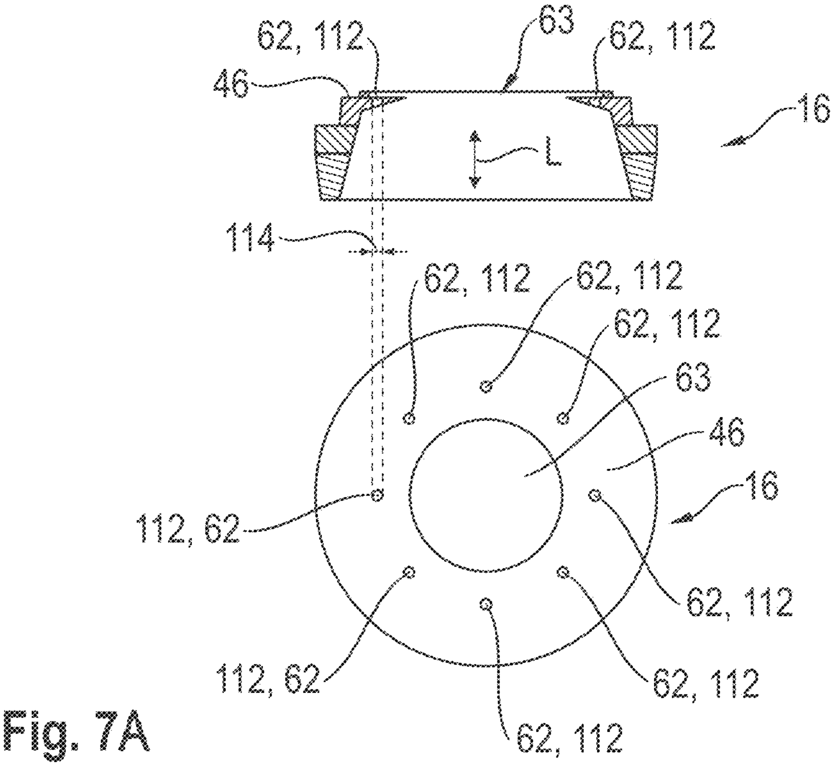
FIG. 7A shows a longitudinal section through and a plan view of a first embodiment of an insert.
Figure 7B:
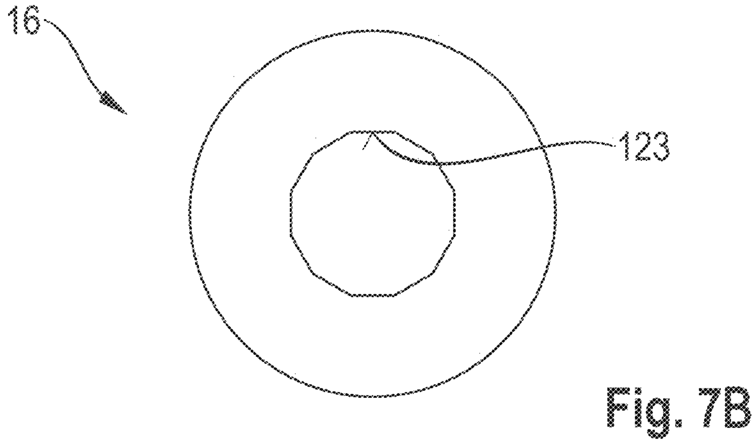
FIG. 7B shows a schematic plan view of a second embodiment of the insert.
Figure 7C:
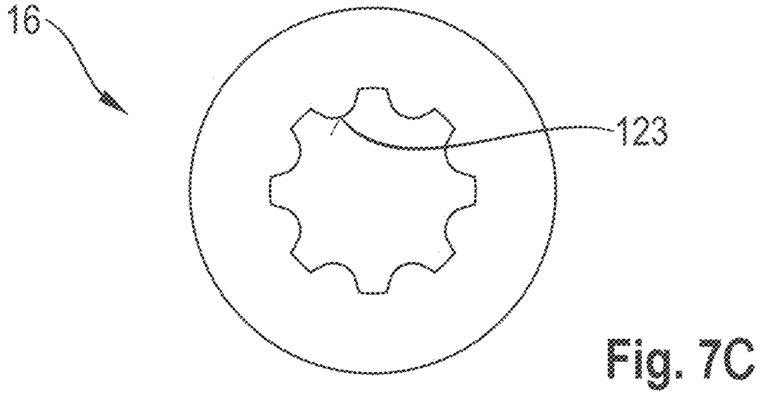
FIG. 7C shows a schematic plan view of a third embodiment of the insert.
Figure 7D:
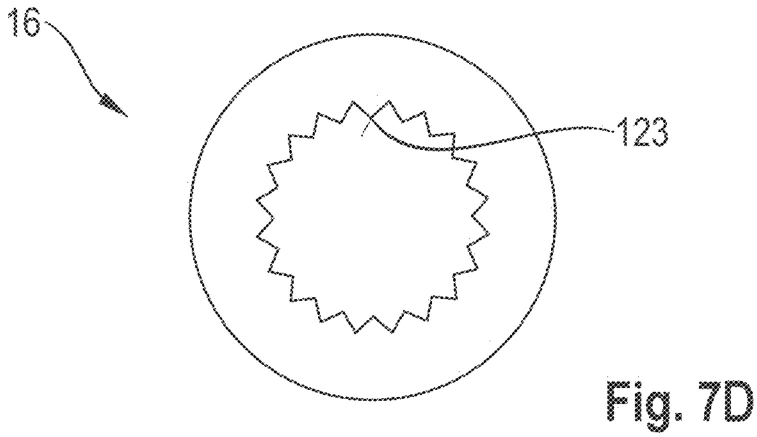
FIG. 7D shows a schematic plan view of a fourth embodiment of the insert.
Figure 8:
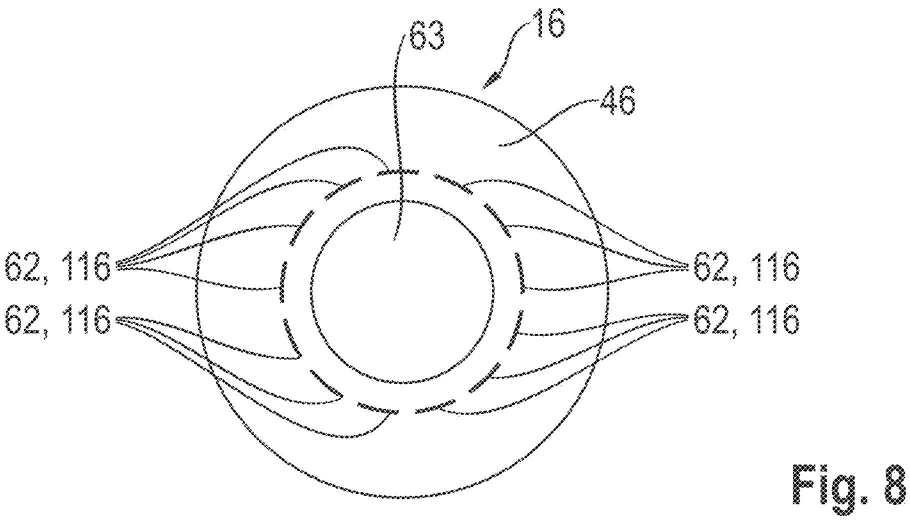
FIG. 8 shows a plan view of a further embodiment of the insert.
Figure 9:
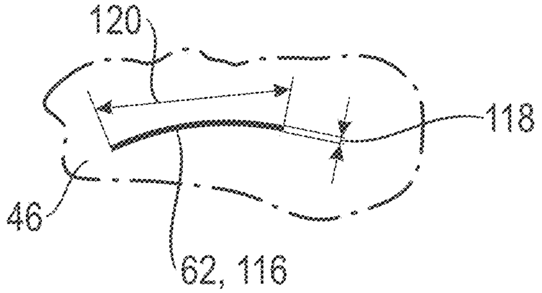
FIG. 9 shows a detailed view of a ventilation slot of the insert from FIG. 8.
Figure 10:
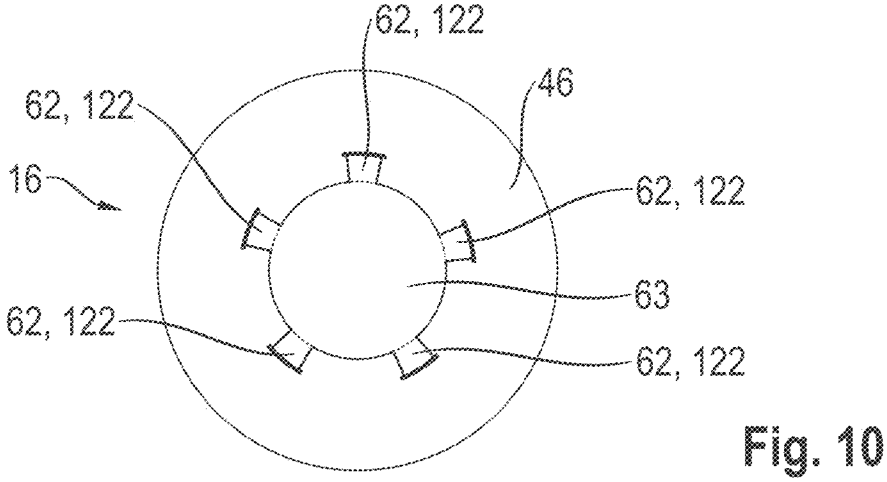
FIG. 10 shows a plan view of a further embodiment of the insert.
Figure 11:
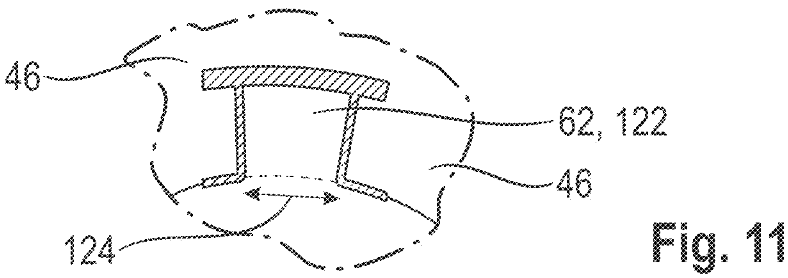
FIG. 11 shows a detailed view of a ventilation notch of the insert from FIG. 10.
Figure 12:
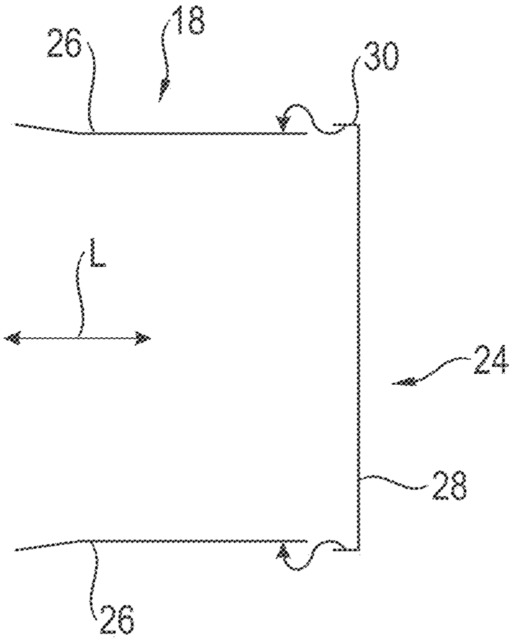
FIG. 12 shows an alternatively designed cartridge in which a film tube and a base part are welded to one another.
Figure 13A:
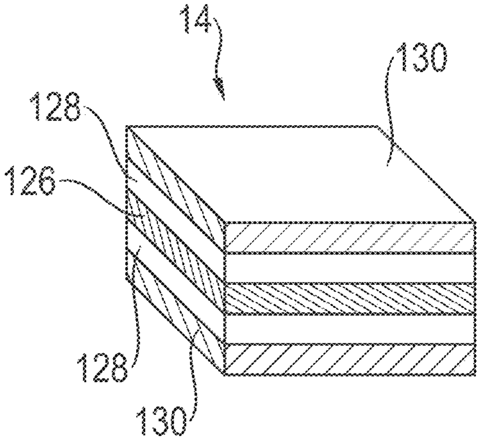
FIG. 13A shows a schematic design of the cover.
Figure 13B:
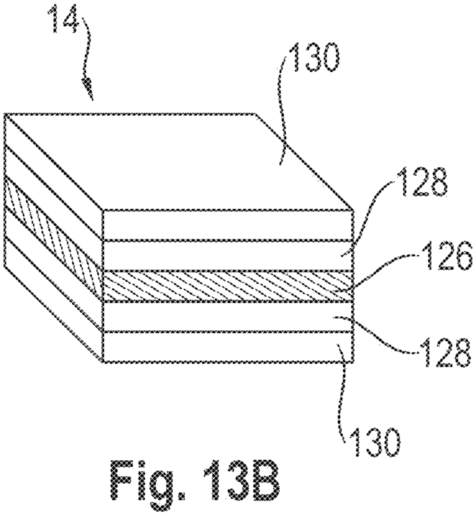
FIG. 13B shows a schematic design of an alternatively designed cover.
Figure 14:
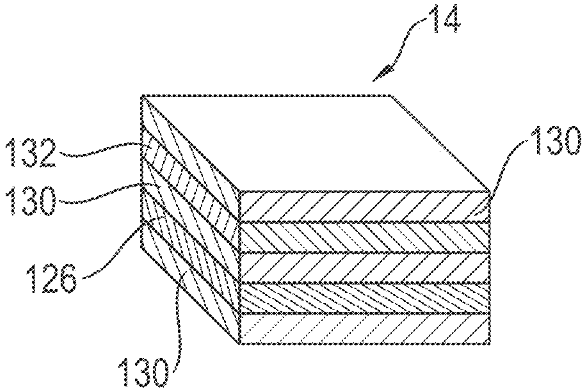
FIG. 14 shows a schematic design of a further alternatively designed cover.
Figure 20:
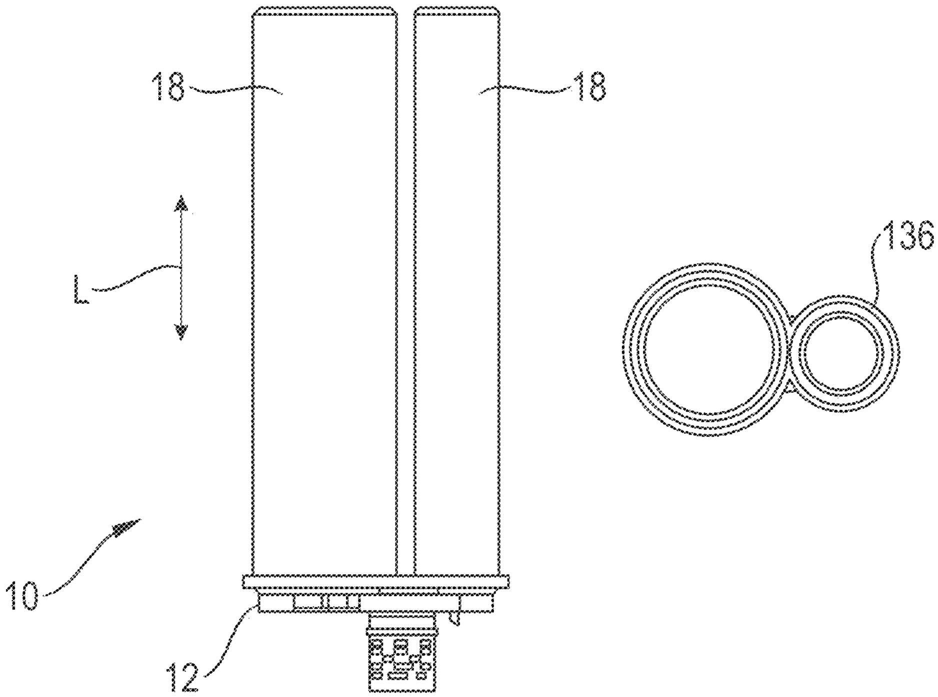
FIG. 20 shows a side view and a plan view of a further embodiment of a cartridge having two film pouches, the film pouches being jointly connected to the head part in a welding process.
Figure 21:
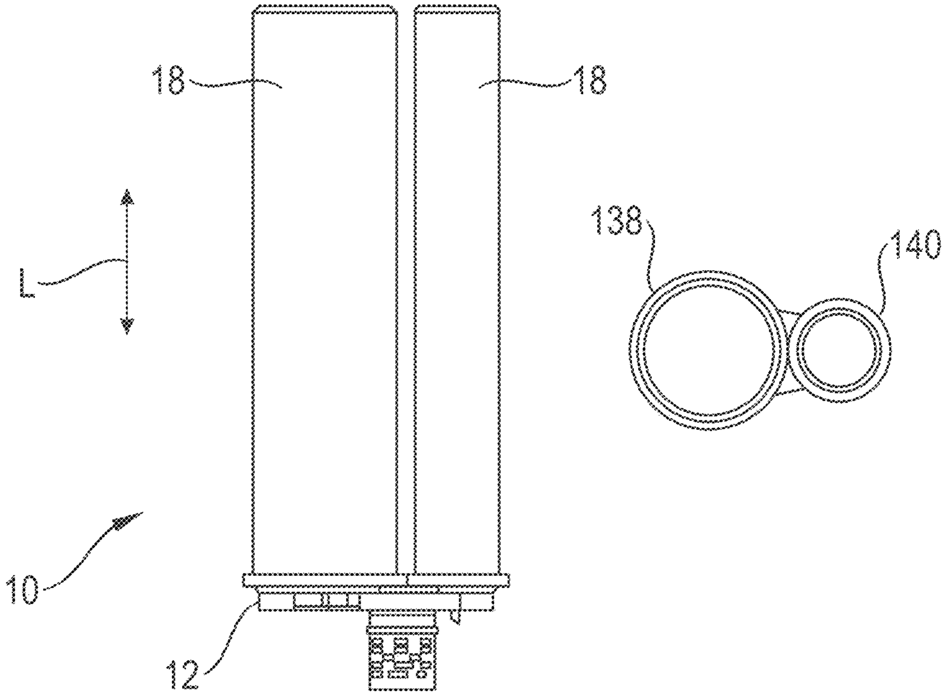
FIG. 21 shows a side view and a plan view of a further embodiment of a cartridge having two film pouches, the film pouches being separately connected to the head part in a welding process.

In the drawings, identical and equivalent components are provided with the same reference signs. In the drawings:

FIG. 1 is a longitudinal section through a cartridge according to the invention in a first embodiment in an exploded view;

FIG. 2A is a detailed view of the insert from FIG. 1 with a cover designed as a film in a longitudinal section;

FIG. 2B is a detailed view of a further embodiment of an insert for connecting a cover designed as a film according to FIG. 2A in a longitudinal section;

FIG. 2C is a detailed view of the insert according to FIG. 2B with a cover designed as a plastics plate;

FIG. 3A is a plan view of the cartridge from FIG. 1 with the predetermined breaking region;

FIG. 3B is a plan view of the cartridge from FIG. 1 with a further embodiment of the predetermined breaking region;

FIG. 4 is a schematic comparison which compares the chamber from FIG. 1 with a chamber known from the prior art and its dispensing behavior;

FIG. 5 is a schematic illustration of the method according to the invention for producing a cartridge according to the invention in a second embodiment;

FIG. 6 is a simplified view of a cartridge and a filling device for filling a chamber of the cartridge according to FIG. 1 with a chemical composition;

FIG. 7A is a longitudinal section through and a plan view of an embodiment of the insert;

FIGS. 7B-7D are schematic plan views of further embodiments of the insert;

FIG. 8 is a plan view of a further embodiment of the insert;

FIG. 9 is a detailed view of a ventilation slot of the insert from FIG. 8;

FIG. 10 is a plan view of a further embodiment of the insert;

FIG. 11 is a detailed view of a ventilation notch of the insert from FIG. 10;

FIG. 12 shows an alternatively designed cartridge in which a film tube and a base part are welded to one another;

FIG. 13A schematically shows a design of the cover;

FIG. 13B is a schematic design of an alternatively designed cover;

FIG. 14 is a schematic design of a further alternatively designed cover;

FIG. 15-19 show details from various embodiments of covers that differ from one another in terms of the design of the predetermined breaking region;

FIG. 20 is a side view and a plan view of a further embodiment of a cartridge having two film pouches, the film pouches being jointly connected to the head part in a welding process; and FIG. 21 is a side view and a plan view of a further embodiment of a cartridge having two film pouches, the film pouches being separately connected to the head part in a welding process.

EMBODIMENTS

FIG. 1 is an exploded view of a cartridge 10 in a longitudinal section.

The cartridge 10 comprises a head part 12, two covers 14, two inserts 16 and two film pouches 18.

The film pouches 18 are inherently non-rigid and each have a cylindrical and substantially elongate shape. The film pouches 18 each delimit a chamber 20 and have an opening 22, the chamber 20 being in particular sealingly closable by means of the film pouches 18.

In the embodiment shown, the film pouch 18 is formed by a base part 24 and a film tube 26. The base part 24 has a base 28 and a collar 30 extending around the base 28. The film tube 26 is attached on the outside of the collar 30 by welding or gluing. In principle, the film tube 26 can also be attached to the inside of the collar 30 by welding or gluing.

The film tube 26 can be produced, for example, from a film by gluing or welding edge regions. It is also possible for a prefabricated film tube or a prefabricated film pouch to be used.

The base 28 is, for example, circular, such that the chamber 20 is cylindrical. In principle, however, any shape of the base 28 is conceivable, for example rectangular or polygonal.

The insert 16 is inherently rigid and is inserted on the inside through the opening 22 at least partially into the corresponding chamber 20 of an associated film pouch 18.

FIGS. 2A, 2B and 2C show different design variants of an insert 16 or a cover 14, the inserts 16 each being provided for connection to a film pouch 18.

The insert 16 according to FIG. 2A has three portions 32, 34 and 36 in one piece which are arranged one on top of the other with respect to a longitudinal direction L of the film pouch 18 or the cartridge 10, i.e. each adjoin one another. The first portion 32 is arranged on a side facing away from the head part 12 and the third portion 36 is arranged on a side facing the head part 12. The first portion 32 has, for example, a thickness D1 in the longitudinal direction L of in particular less than 4 mm, the second portion 34 has a thickness D2 in the longitudinal direction L of in particular less than 5 mm, and the third portion 36 has a thickness D3 in the longitudinal direction L of in particular less than 5 mm.

An inner side 38 of the first two portions 32 and 34 facing the chamber 20 and of a first region of the third portion 36, which extends from the transition of the second portion 34 to the third portion 36 to a bend 40, has an angle $\alpha$ with respect to a vertical V, which angle can assume values from 0 to 45°. As a result, the chamber tapers toward the head part 12.

The inner face 38 of the third portion 36 has, on a side facing the head part 12, above the bend 40, a second region which has an angle $\beta$ with respect to a horizontal H arranged perpendicularly to the longitudinal axis L. The angle $\beta$ can have a value between 0° and 60°.

The third portion 36 has an outer face 42 facing away from the chamber 20 and comprising two surfaces 44 and 46. The surface 46 is arranged, in the longitudinal section, parallel to the horizontal H and thus to the base 28, whereas the surface 44 has, in the longitudinal section, an angle $\delta$ with respect to the vertical or the longitudinal direction, but can also be arranged substantially parallel to the vertical V in an alternative embodiment.

Accordingly, the surfaces 44 and 46 can be arranged substantially perpendicularly to one another in the longitudinal section.

FIG. 2B shows a further embodiment of the insert 16, which differs from the insert 16 according to FIG. 2A substantially in that the third portion 36 has a conical region surrounding the surface 46 and facing the head part 12. The surface 46 facing the head part 12 forms an angle $\varepsilon$ of 10-50° with the horizontal H, particularly preferably of approximately 15°-35°. The surfaces 44 and 46 are not arranged perpendicularly to one another in the longitudinal section and here enclose an obtuse angle. Furthermore, the radially outer surface 42 of the third portion 36 is arranged substantially in the longitudinal direction L.

The insert 16 shown in FIG. 2C substantially corresponds to the insert 16 according to FIG. 2B, the cover 14 being designed as a plastics plate in the embodiment shown.

The third portion 36 of the inserts 16 according to FIGS. 2A and 2B is set back with respect to the outer face 42 compared to the second portion 34, the third portion 36 having a smaller outer diameter than the second portion 34. This forms a stepped raised portion 48 of the insert 16.

The third portion 36 has a width 50 of 3 to 8 mm in the direction of the horizontal H and is offset inwardly by a radial offset 52 of 2 to 4 mm with respect to the second portion 34.

On the surface 46 facing the head part 12 and thus facing upwards, which surface is substantially parallel to the horizontal H, a material extension 54 is provided which protrudes substantially perpendicularly from the surface 46 parallel to the horizontal H, i.e. in the longitudinal direction L. The material extension 54 has a predefined height 56, as will be explained below, and a width 58 of in particular less than 2 mm.

The outer face 42 of the first portion 32 has an angle γ between 0 and 10° with respect to the vertical V and the outer face 42 of the third portion 36 forms an angle δ of 0 to 60° with the longitudinal direction L.

The inner side 38 of the portions 32, 34, 36 facing the chamber 20 encloses a passage 60 which, starting from the first portion 32, tapers conically in the direction of the third portion 36. In this respect, the passage 60 has a larger opening 61 in the region of the first portion 32 compared to the opening 63 in the region of the third section 36.

In addition, the insert 16 has a plurality of holes 62 in the third portion 36 which are arranged between the material extension 54 and a radially inwardly pointing tip 64 of the third portion 36 and in this case extend substantially in the longitudinal direction L.

In principle, the insert 16 is annular, so that it can be coupled to the cylindrical tube 26.

The inside of the film tube 26 is connected to the insert 16, the film tube 26 being connected to the outer face 42 of the first portion 32. The film tube 26 is preferably welded or glued to the insert 16.

The cover 14 is provided between the head part 12 and the insert 16, as can be seen from FIG. 1. In the assembled state of the cartridge 10, the cover 14 rests in radially outer regions on the stepped raised portion 48, substantially on the two surfaces 44 and 46.

The cover 14 is connected to the insert 16, for example by welding or gluing, and closes the passage 60 and the holes 62. Accordingly, the cover 14 closes the chamber 20, so that the chamber 20 is preferably completely sealed in the assembled state of the cover 14.

In the embodiment shown in FIG. 1, the head part 12 has two receptacles 66, which interact with the inserts 16 and the cover 14 in the assembled state. The receptacle 66 is divided into two regions, as can also be seen from FIG. 3A.

In a support region 68, the receptacle 66 is adapted to the insert 16 and the stepped raised portion 48 such that the insert 16, as can be seen in FIG. 1, rests with the cover 14 against a side surface 70 of the receptacle 66, i.e. by means of its radially outwardly facing outer face 42, in particular that of the third portion 36, and, as can be seen in FIG. 3A, rests on the support region 68, with the cover 14 lying therebetween.

Furthermore, the receptacle 66 comprises an expansion region 72 which is designed as a depression in the receptacle 66 and, as can be seen in FIG. 1, forms an expansion space 74, the function of which will be explained below.

The head part 12 also has an outlet nozzle 76 with an outlet opening 78 and an outlet channel 80. The outlet opening 78 is in fluid connection with the expansion space 74 and the receptacle 66 via the outlet channel 80.

The outlet nozzle 76 shown in FIG. 1 has two outlet channels 80 which are in fluid connection with the particular receptacle 66 and are separated from one another by a partition 82 which extends from a connecting piece 84 separating the receptacles 66 to the outlet opening 78.

It is possible for the two outlet channels 80, as shown in FIGS. 1 and 3A, to have different cross-sections, in particular different diameters, in order to set a mixing ratio of the compositions, as will be explained below.

The outlet nozzle 76 also has a thread 86 by means of which an attachment (not visible) can be attached to the outlet opening 78 of the head part 12. This attachment can be part of a dispensing device into which the cartridge 10 can be inserted or placed.

The cover 14 comprises a predetermined breaking region 88 which, when the cartridge 10 is connected to the head part 12, is arranged in the region of the expansion region 72 of the receptacle 66. In the present case, the cover 14 has a lower material thickness or material strength in the predetermined breaking region 88 than in other regions of the cover. Due to the lower material thickness, the cover 14 is correspondingly weakened in regions in the predetermined breaking region 88.

The predetermined breaking region 88 can be produced in the cover 14 by, for example, a laser or a heated stamp. The predetermined breaking region 88 can be produced, for example, after the cover 14 is arranged on the insert 16, preferably from a side facing away from the chamber 20. Alternatively or in addition, the predetermined breaking region 88 can also be produced from a side of the cover 14 facing the chamber 20. For example, opposing regions can be machined from both sides of the cover 14 so that the predetermined breaking region 88 extends on both sides of the cover 14. The predetermined breaking region 88 can also be produced by deforming material by means of a stamp or by melting material by means of a stamp. It is also possible for material in the predetermined breaking region 88 to be vaporized by means of a laser, in particular on a side facing away from the chamber 20, such that the predetermined breaking region 88 represents, for example, a notch in the cover 14 that is visible from the outside. If the predetermined breaking region 88 is produced by hot stamping, the predetermined breaking region 88 is also visible from the outside. The predetermined breaking region 88 can also be produced by scoring. The predetermined breaking region 88 can also be produced using the methods mentioned before the cover 14 is attached to the insert 16.

FIG. 313 is a view that is comparable to FIG. 3A, with only the differences being discussed below. The predetermined breaking region 88 is arranged in a region of the expansion region 72 which faces the relevant other film pouch 18. FIG. 3B shows a circumferential weld seam 89 by means of which the cover 14 is fixed to the surface 46 of the insert 16. The weld seam 89 is delimited in a simplified manner by two circles 91, 93, shown here in dashed lines, which run substantially concentrically to a longitudinal axis of the film pouch 18, the weld seam 89 here representing a portion of the surface 46. In the present case, the predetermined breaking region 88 represents, for example, a portion of the weld seam 89, the predetermined breaking region 88 being congruent with the welding seam 89 at least in portions, in particular completely. As an alternative to this, the predetermined breaking region 88 can also be in the immediate vicinity of the weld 89. The predetermined breaking region 88 is produced during the production of the weld seal 89 by varying welding parameters.

The predetermined breaking region 88 is a targeted weakening of the cover 14, such that when the film pouch 18 or the chamber 20 is dispensed by a dispensing device, the cover 14 in the predetermined breaking region 88 tears or opens in a defined manner.

While the cartridge 10 is being dispensed, the base part 24 of the chamber 20 is pressed in the direction of the head part 12, for example by means of a stamp of a dispensing device. This causes the pressure in the chamber 20, which is directed in the direction of the cover 14, to increase, as a result of which the composition located in the chamber 20 is pressed against the cover 14. The cover 14 then expands into the expansion region 72. The predetermined breaking region 88 of the cover 14 is associated with the expansion region 72, the predetermined breaking region 88 breaking up above a certain force or a corresponding pressure, so that the composition can flow through the passage 60 of the insert 16 and the torn-open predetermined breaking region 88 from the chamber 20 into the outlet channel 80. The composition can thus flow out of the head part 12 through the outlet opening 78 and be applied, for example, to an object.

Due to the fact that, after the chamber 20 has been completely pressed out, the composition located in the expansion space 74 and in the outlet channel 80 cannot be pushed further out of the outlet opening 78, the outlet channel 80 and the expansion space 74 should be kept as small as possible.

It has been found to be advantageous if the expansion region 72, which is associated with the chamber 20, has an area of 1-40% based on the total area of the relevant receptacle 66 or 68, better 2-35% and preferably 3-30%. The expansion height 90 of the expansion space 74 should be between 2.0 and 15.0 mm, in particular 3.0 and 12.0 mm and preferably 5.0 and 10.0 mm.

The opening force required to break up the predetermined breaking region 88 can be adapted by changing the expansion region 72. Furthermore, it is also possible to adapt the opening force by means of a corresponding arrangement of the predetermined breaking region 88 on the cover 14 or the shape and size of the predetermined breaking region 88.

For example, the required opening force is increased if the predetermined breaking region 88 is displaced from a central region in an edge region of the expansion surface 72.

The expansion region 72 and the predetermined breaking region 88 are selected such that the two chambers 20 substantially break open when the opening force is identical, so that the compositions can flow out of the chambers 20 synchronously. Accordingly, a predetermined mixing ratio of the compositions from the two chambers 20 can be implemented, which is predetermined by an area ratio of the bases 28 or the division of the outlet channel 80 by the partition 82.

FIG. 4 shows a schematic comparison between the chamber 20 of the cartridge 10, which is arranged in the upper half of FIG. 4, and a chamber 92 of a cartridge 94 known from the prior art, which is arranged in the lower half of the figure, in a longitudinal section.

The left-hand side of FIG. 4 shows the cartridges 10, 94 in a filled state and the right-hand side of FIG. 4 shows the cartridges 10, 94 in a dispensed or emptied state.

In the filled state, the cartridges 10, 94 in the present example are enclosed by a cuboid 96 of equal volume, which is shown with dashed lines. A width B, a length L and a height (not shown) of the two cuboids 96 are substantially the same here.

The chamber 92 of the cartridge 94 from the prior art is closed on both sides by clips 98. The clips 98 result in the chamber 92 being closed in a spherical manner at each end, such that the chamber 92 has a smaller volume than the cuboid 96 according to the cartridge 10 according to the invention. Accordingly, more composition can be filled into the chamber 20 than into the chamber 92.

The dispensing of the cartridges 10, 94, represented by an arrow, results in the long sides of the chambers 20, 92 being compressed and arching in the manner of an accordion.

The chamber 20 of the dispensed cartridge 10 is enclosed by a cuboid 100. The cuboid 100 is smaller than the cuboid that encloses the dispensed chamber 92 from the prior art, such that the dispensed chamber 20 has a smaller volume than the dispensed chamber 92 from the prior art. Accordingly, the cartridge 10 can accommodate more composition than the cartridge 94 known from the prior art, with the same available initial volume according to cuboid 96, and less composition remains in the cartridge 10 after dispensing compared to the cartridge 94 from the prior art.

With reference to FIGS. 5 and 6, the method for producing a cartridge 10 will now be described according to a further embodiment which substantially corresponds to the embodiment described in more detail above, such that only the differences will be discussed below. Identical components are provided with the same reference symbols, and reference is made to the explanations above with regard to their design and their function.

In contrast to the first embodiment, the cartridge 10 in FIG. 5 has only one chamber 20, such that only one insert 16, one cover 14, one receptacle 66 and one outlet channel 80 are present. Accordingly, no partition 82 is provided which divides the outlet channel 80 into partial channels.

In a first method step—the steps are represented by arrows—the base part 24 and the insert 16 are provided. Subsequently, a film tube 26 is attached to the outside of the collar 30 on the circumferential side or circumferentially around the base part 24, for example by gluing or welding, so that a film pouch 18 is produced which has an opening 22. The film tube 26 can also be attached to the collar 30 on the inside.

The inside of the opening 22 is then attached to the outer face 42 of the insert 16 in the region of the first portion by welding and/or gluing.

In a next step, which can be seen in FIG. 6, the chamber 20 is filled with a composition 102 by a filling device 104 which has a filling head 106 and a filling tube 108. The filling head 106 and the filling tube 108 are in fluid communication with one another.

The filling head 106 is connected, for example, to a reservoir of the composition 102 and pumps the composition 102 out of the reservoir into the filling head 106. The filling tube 108 protrudes through the opening 63 and the passage 60 of the insert 16 into the chamber 20, such that the composition 102 can be introduced from the filling head 106 through the filling tube 108 into the chamber 20.

During the filling process, the air in the chamber 20 can escape through the holes 62, such that the filling tube 108 can have the same cross-section as the opening 63 of the third portion 36 of the insert 16. The composition 102 can thus be introduced into the chamber 20 through a large opening, so that little pressure is required for the filling process.

The geometry of the insert 16 is adapted to a filling cone 110 of the chemical composition 102. The geometry is adapted in particular to the filling cone 110 of viscous chemical mortar. As a result, relatively little and in particular no air is present between the insert 16 and the chemical composition 102 after the filling process. This is advantageous since the presence of air can reduce the durability of the composition 102 and, in the case of larger air bubbles, can have an undesirable effect on the mixing ratio achieved when using two film pouches 18.

After the filling process, as shown in FIG. 5, the cover 14 is attached to the insert 16.

In order to be able to close the opening 63 tightly, a material extension 54 can be provided which extends all the way around in this case and is connected to the third portion 36 of the insert 16 and which can be annular. A plurality of separate material extensions 54 can also be provided, which are, for example, partially annular and each extend only over a portion of the circumference of the insert 16. The at least one material extension 54 serves as a melting point, such that the cover 14 and the insert 16 can be connected to one another in one piece, in particular integrally bonded, by the material extension 54 being melted.

The cover 14 is also attached to the surfaces 44 and 46 of the insert 16. For example, the molten material of the material extension 54 flows along the surfaces 44, 46 to form a kind of adhesive layer for the cover 14.

The cover 14 can be designed as a monofilm. After the insert 16 has been closed, part of the cover 14 is removed from the top of the cover 14, such that a predetermined breaking region 88 is created. This takes place, for example, in the closed state of the chamber 20, by material of the cover 14 being removed from the outer face.

When the cover 14 is fastened to the surface 46 of the insert 16 by welding, the predetermined breaking region 88 can be formed by a defined setting of the welding parameters in a predefined region. For example, a higher pressure, an increased temperature or an extended welding duration or a combination of these parameters can be provided in order to produce the predetermined breaking region 88 during the process of welding the cover 14 to the insert 16. The predetermined breaking region 88 can be produced in a simple manner in the immediate vicinity or in the surface 46.

In a further method step, the head part 12 is provided and the insert 16 is fastened with the cover 14 in the receptacle 66. In particular, the surface 44 of the stepped raised portion 48 rests against the side surface 70 of the receptacle 66. This method step can take place, for example, by gluing or welding or a similar fastening method.

FIG. 7A shows the insert 16 in a longitudinal section in the upper region and a corresponding plan view of the insert 16 in a lower region.

The plan view according to FIG. 7A shows that the holes 62 are arranged as ventilation openings 112 circumferentially around the opening 63 and have a diameter 114 of in particular less than 3 mm. In the present embodiment, the insert 16 has eight ventilation openings 112. In principle, any number of ventilation openings 112 can be provided. The ventilation openings 112 can be designed as ventilation bores.

Further embodiments of holes 62 are shown with reference to FIG. 8 to FIG. 11.

The top view of the insert 16 according to FIG. 8 shows that the holes 62 are designed as ventilation slots 116 which are arranged circumferentially around the opening 63, in particular at regular intervals from one another and/or coaxially to the central axis of the opening 63.

FIG. 9 is a detailed view of one of the ventilation slots 116 from FIG. 8. A width 118 of the ventilation slot 116 in the radial direction is in particular less than 3 mm and a length 120 in the circumferential direction is, for example, 1 to 20 mm.

In FIG. 10 it can be seen that the holes 62 can also be designed as a ventilation notch 122. In this embodiment, the ventilation notches 122 function as an enlargement of the opening 63, the original shape of which is shown in dashed lines in the region of the ventilation notches 122.

A detailed view of a ventilation notch 122 is shown in FIG. 11, from which it can be seen that a width 124 of the ventilation notch 122 in the circumferential direction has a value of in particular less than 4 mm.

FIGS. 7B, 7C, and 7D show further possible embodiments of inserts 16 for ventilating the film pouch 18 during a filling process. A contour 123 of the insert 16 on the inside in the radial direction is not circular in this case in contrast to the embodiment of the insert 16 according to FIG. 1. In FIG. 7B, the inner contour 123 represents a particularly uniform polygon, here a dodecagon, in FIG. 7C a sine wave ring and in FIG. 7D a gear geometry. As a result, during a filling process using a cylindrical filling pipe 108, air can escape through the opening 63 without holes 62 having to be provided in the insert 16. These can also be provided in alternative embodiments of inserts 16.

FIG. 12 shows a further possibility for producing the film pouch 18. Instead of fastening the outside of the collar 30 to the inside of the film tube 26, the inside of the collar 30 can also be fastened to the outside of the film tube 26, as already explained.

The cover 14 can be designed as a monofilm. With reference to FIGS. 13A, 13B and 14, embodiments of the cover 14 are shown in which the cover 14 is formed by several layers or by a plastics plate.

In FIG. 13A, the cover 14 comprises five layers. A middle layer is designed as a barrier layer 126, for example in the form of an aluminum layer. The layers are numbered from top to bottom in the figures, so that the top layer represents a first layer and a bottom layer represents a fifth layer. A second layer and a fourth layer are each designed as a polyethylene layer (PE layer) 128. The top and bottom layers, i.e. the first layer and the fifth layer of the cover 14, are each designed as a polypropylene layer (PP layer) 130.

The barrier layer 126 prevents water vapor and/or oxygen from entering the chamber 20. In particular in the case of chemically active compositions, water vapor and/or oxygen can lead to the composition arranged in the chamber 20 reacting and thereby reducing its durability or changing its constitution. In addition, the material in the chamber 20 advantageously cannot outgas due to the barrier layer 126.

FIG. 13B shows an alternative design of the cover 14 again with five layers. The middle layer is again designed as a barrier layer 126. In contrast to the embodiment according to FIG. 13A, in addition to the second layer and the fourth layer 128, the first layer and the fifth layer 130 are also made of polyethylene.

The embodiment of the cover 14 in FIG. 14 again has five layers, with the barrier layer 126 forming the fourth layer. The first layer, the third layer and the fifth layer are each designed as a PE layer 130 in this embodiment. The second layer 132 is a layer 132 made of bi-axially arranged polypropylene.

Alternatively, the cover 14 can be designed having a particularly inherently rigid plastics plate, which preferably comprises PE, PP, PET, PVC, ABS, PA, PLA or comparable materials. The cover 14 is in turn connected to the insert 16 by gluing or welding to the insert 16 of the embodiment of FIG. 2A or FIG. 2B.

The embodiments of the cover 14 according to FIGS. 13A, 13B and 14 are to be understood only as examples. In principle, any material mentioned at the outset is possible for a layer of the cover 14 and any number of layers is also conceivable.

With reference to FIGS. 15 to 19, various embodiments of predetermined breaking regions 88 are shown below, which differ from one another with regard to their shape. In all of these figures, a detailed view of a plan view of the cover 14 is shown, the predetermined breaking region 88 being more clearly visible in each case.

Figure 15:
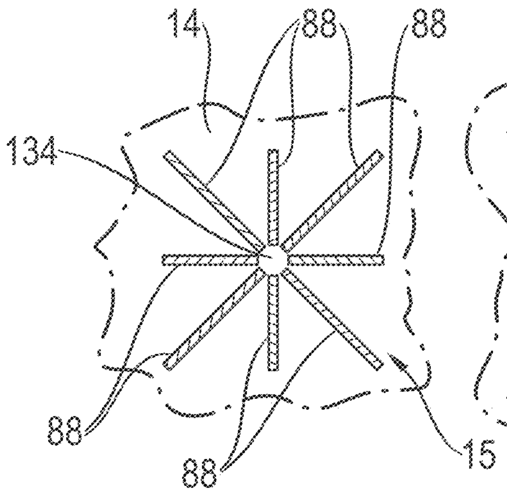
FIG. 15 shows details of a first embodiment of a cover with a first design of the predetermined breaking region.

In FIG. 15, the predetermined breaking region 88 is designed in several parts and in the present case has eight portions, each of which extends radially outward from a central point 134 to the central point 134 in a substantially straight line, such that the predetermined breaking region 88 forms a star-shaped pattern. The predetermined breaking region 88 thus represents an overall symmetrical, in this case point-symmetrical, pattern.

Figure 16:
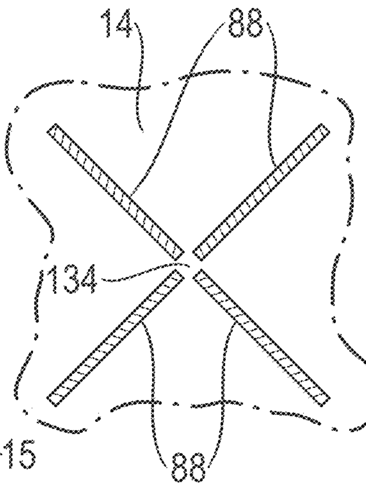
FIG. 16 shows details of a second embodiment a cover with a second design of the predetermined breaking region.

In FIG. 16, the predetermined breaking region 88 has four portions, which in turn extend substantially in a straight line outward in the radial direction from the central point 134, such that the predetermined breaking region represents a cross-shaped pattern, which in this case is symmetrical with respect to the central point 134.

Figure 17:
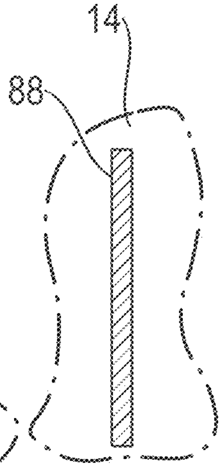
FIG. 17 shows details of a third embodiment of a cover with a third design of the predetermined breaking region.

The predetermined breaking region 88 shown in FIG. 17 is formed therein by a dash extending in a straight line.

Figure 18:
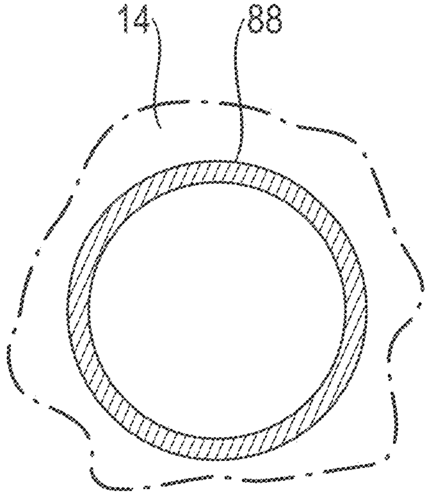
FIG. 18 shows details of a fourth embodiment of a cover with a fourth design of the predetermined breaking region.

In the embodiment according to FIG. 18, the predetermined breaking region 88 is formed by a circular delimitation which can be designed as a continuous line or as a perforation. The line or the perforation delimits the predetermined breaking region 88 from the further region of the cover 14 lying outside the line or the perforation.

Figure 19:
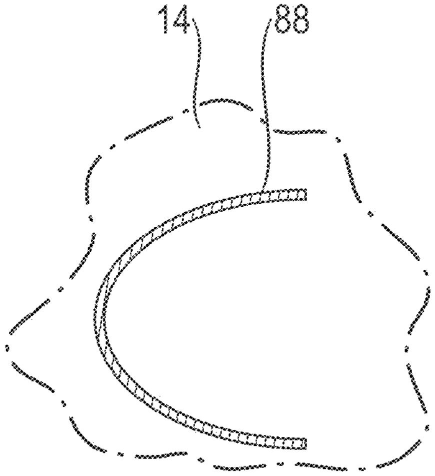
FIG. 19 shows details of a fifth embodiment of a cover with a fifth design of the predetermined breaking region.

In the embodiment according to FIG. 19, the predetermined breaking region 88 is defined by a substantially semicircular line, which in turn can be designed as a perforation or a continuous line.

FIG. 20 is a side view and a plan view of a further embodiment of a cartridge 10 having two film pouches 18, the film pouches 18 being connected to the head part 12 in a common welding process. The inherently rigid insert 16 is first connected to the film pouch 18 and then filled with a composition 102 via the passage 60. Again, the passage 60 is then closed by means of the cover 14, the cover 14 being connected to the insert 16 in the manner described in more detail above and in particular being welded thereon.

The cover 14 is designed here so that it can be welded on both sides, such that in a further step the film pouches 18 are connected to the head part 12 in a welding process. In the embodiment according to FIG. 20, this can be carried out for both film pouches 18 using a common welding tool 136 and, in the embodiment according to FIG. 21, for each film pouch 18 using two separate welding tools 138, 140 and thus independently of one another, one welding tool 138 being associated with one film pouch 18 and the other welding tool 140 being associated with the other film pouch 18.

In this case, the inserts 16 have a corresponding countercontour to the head part 12, such that the inserts 16, when connected to the head part 12, lie substantially flat on the head part 12 via the cover 14.

Each welding tool 136, 138, 140, shown only schematically in FIGS. 20 and 21, is guided from a side facing away from the head part 12 over the film pouch 18 to a contact region of the head part 12 with the insert 16, the welding tools 138, 140 completely encompassing the particular film pouch 18 and the corresponding contours of the insert 16 and the head part 12 in the embodiment according to FIG. 21, thus producing in each case a connection, extending completely around the circumference, between the head part 12 and the film pouch 18 via the cover 14. The two film pouches 18 can be connected to the head part 12 at the same time, partially overlapping or one after the other.

In the embodiment according to FIG. 20, the common welding tool 140, by means of which the two film pouches 18 can be connected to the head part 12 in a single step, comprises the film pouches 18 on the circumference, for example except for a mutually facing region of the film pouches 18, thus producing a connection, extending completely around the outside of both film pouches 18, between the head part 12 and the two film pouches 18 via the respective covers. In this case, it is possible that there is no connection of the inserts 16 to the head part 12 via the covers 14 in a mutually facing region of the two film pouches 18.

In order to connect the head part 12 to the insert 16 or the inserts 16, an inductive and contactless welding process, for example a high-frequency welding process, is preferably provided. The cover 14 preferably has an aluminum layer which is heated during the welding process, the heat being conducted through the other layers of the cover 14 to the inserts, in particular made of plastics material, and the head part 12, thereby achieving the welding. In this case, a highly targeted energy input is achieved at the point where the welded connection is to be created.

The various embodiments of the individual components are to be understood as examples. In particular, the various designs and various features of the embodiments can be combined with one another as desired. The features and designs listed as differences are independent and can be combined in various ways.

In the embodiments shown, the cartridge 10 comprises one or two chambers 20 and a corresponding number of covers 14, inserts 16, film pouches 18, receptacles 66 and outlet channels 80. In general, any number of the components mentioned is possible.

The invention claimed is:

1. A cartridge for a dispensing device, having:

at least one non-rigid, elongate film pouch, which has a chamber for receiving a composition, a head part for interacting with the at least one non-rigid, elongate film pouch, and a rigid insert which is a different part from the head part, wherein the rigid insert is connected to the at least one non-rigid, elongate film pouch on a side facing the head part and has a passage closed by a cover, wherein the rigid insert is conical on the side facing the head part.

2. The cartridge according to claim 1, wherein a surface of the rigid insert facing the head part encloses an angle (ε) between 10° and 50° with a horizontal (H) perpendicular to the dispensing direction.

3. The cartridge according to claim 2, wherein the angle (ε) has a value between 15° and 35°.

4. The cartridge according to claim 3, wherein the angle (ε) has a value of 25°.

5. The cartridge according to claim 3, wherein the rigid insert has at least one ventilation opening that is independent of the passage and/or at least one ventilation slot that is independent of the passage, and/or wherein the passage of the rigid insert has at least one ventilation notch in a region facing a central axis of the at least one non-rigid, elongate film pouch.

6. The cartridge according to claim 2, wherein the rigid insert has at least one ventilation opening that is independent of the passage and/or at least one ventilation slot that is independent of the passage, and/or wherein the passage of the rigid insert has at least one ventilation notch in a region facing a central axis of the at least one non-rigid, elongate film pouch.

7. The cartridge according to claim 1, wherein the cover has a predetermined breaking region.

8. The cartridge according to claim 7, wherein the rigid insert has at least one ventilation opening that is independent of the passage and/or at least one ventilation slot that is independent of the passage, and/or wherein the passage of the rigid insert has at least one ventilation notch in a region facing a central axis of the at least one non-rigid, elongate film pouch.

9. A cartridge for a dispensing device, having:

at least one non-rigid, elongate film pouch, which has a chamber fir receiving a composition, and a head part for interacting with the at least one non-rigid, elongate film pouch and having a rigid insert, wherein the rigid insert is connected to the at least one non-rigid, elongate film pouch on a side facing the head part and has a passage closed by a cover, wherein the rigid insert is conical on the side facing the head part, wherein the rigid insert has at least one ventilation opening that is independent of the passage and/or at least one ventilation slot that is independent of the passage, and/or wherein the passage of the rigid insert has at least one ventilation notch in a region facing a central axis of the at least one non-rigid, elongate film pouch.

10. The cartridge according to claim 9, wherein the rigid insert has at least one ventilation opening that is independent of the passage and/or at least one ventilation slot that is independent of the passage, and/or wherein the passage of the rigid insert has at least one ventilation notch in a region facing a central axis of the at least one non-rigid, elongate film pouch.

11. The cartridge according to claim 1, wherein the rigid insert and the head part each have, in a mutually facing region, an interacting and substantially diametrically opposed contour, wherein the cover that is arranged in a region of the contours is weldable.

12. The cartridge according to claim 11, wherein the rigid insert has at least one ventilation opening that is independent of the passage and/or at least one ventilation slot that is independent of the passage, and/or wherein the passage of the rigid insert has at least one ventilation notch in a region facing a central axis of the at least one non-rigid, elongate film pouch.

13. The cartridge according to claim 1, wherein the at least one non-rigid, elongate film pouch is formed by a cylindrical film tube which is closed at a bottom by a base part.

14. The cartridge according to claim 13, wherein the base part is glued and/or welded to the cylindrical film tube.

15. The cartridge according to claim 1, which comprises at least two of the covers, at least two of the inserts, and at least two of the film pouches.

16. A method for producing a cartridge for a dispensing device, having:

at least one non-rigid, elongate film pouch, which has a chamber for receiving a composition, and a head part for interacting with the at least one non-rigid, elongate film pouch and having a rigid insert, wherein the rigid insert is connected to the at least one non-rigid, elongate film pouch on a side facing the head part and has a passage closed by a cover, wherein the rigid insert is conical on the side facing the head part, the method comprising:

providing the at least one non-rigid, elongate film pouch having the chamber, wherein the at least one non-rigid, elongate film pouch is connected to the rigid insert and the base part, the rigid insert having an opening, filling the chamber with the composition through the opening, and closing the opening with the cover.

17. The method according to claim 16, wherein a predetermined breaking region is produced in a region of the cover.

18. The method according to claim 17, wherein the predetermined breaking region of the cover is produced by a laser, by weakening by hot stamping, by scoring, or by welding the cover to the insert.

19. The method according to claim 16, wherein the insert has at least one material extension.

20. The method according to claim 19, wherein the at least one material extension surrounds the opening, and wherein the at least one material extension melts during the closing of the opening.

* * * * *